Sept. 10, 1946.　　　K. MILLER　　　2,407,319
TWO-WAY CLUTCH
Filed Oct. 14, 1942　　　2 Sheets-Sheet 1

Inventor:
Kay Miller
By
McCanna, Wintercorn & Morsbach
Attys.

Sept. 10, 1946.  K. MILLER  2,407,319
TWO-WAY CLUTCH
Filed Oct. 14, 1942  2 Sheets-Sheet 2

Inventor.
Kay Miller
By
McCanna, Wintercorn & Morsbach
attys.

Patented Sept. 10, 1946

2,407,319

UNITED STATES PATENT OFFICE 2,407,319

TWO-WAY CLUTCH

Kay Miller, Rockford, Ill., assignor to The Atwood Vacuum Machine Company, Rockford, Ill., a copartnership composed of Seth B. Atwood and James T. Atwood Application October 14, 1942, Serial No. 461,960

21 Claims. (Cl. 192—48)

This invention relates to friction clutches and is more particularly concerned with a new and improved two-way clutch especially intended for use with a two-rate transmission in a tractor, tank, truck, or the like, although the invention is suitable for other uses.

The principal object of my invention is to provide a friction clutch of the kind mentioned, so designed that a single spring means is usable to apply spring pressure to the pressure plate in either direction and cooperates with a single clutch actuating lever means oscillatable in either direction from a neutral position by rollers carried on a throw-out collar.

A salient feature of the present clutch lies in the provision of a ring attached to the pressure plate for movement thereof to either of its two engaged positions, and two other rings mounted on opposite sides of the first ring and urged toward each other by the aforesaid single spring means, the aforesaid single clutch actuating lever means being operative between these spring pressed rings to transmit the pressure of the springs to the pressure plate in either direction, according to the position of the throw-out collar.

Another important feature of this clutch consists in the provision of spaced rollers on the throw-out collar, which in the neutral position of the clutch actuating lever engage flat surfaces on the lever to hold the same positively in a neutral position, while allowing a certain amount of free movement of the throw-out collar in the neutral zone so as to avoid the disadvantages of too sensitive, hair trigger, manual control, the lever being bifurcated to provide diverging arms, one for engagement with one of the rollers and the other for engagement with the other of said rollers for oscillation of the lever in one direction or the other, according to the direction of movement of the throw-out collar.

The invention is illustrated in the accompanying drawings, in which—

The same reference numerals are applied to corresponding parts throughout the views.

Figure 1:
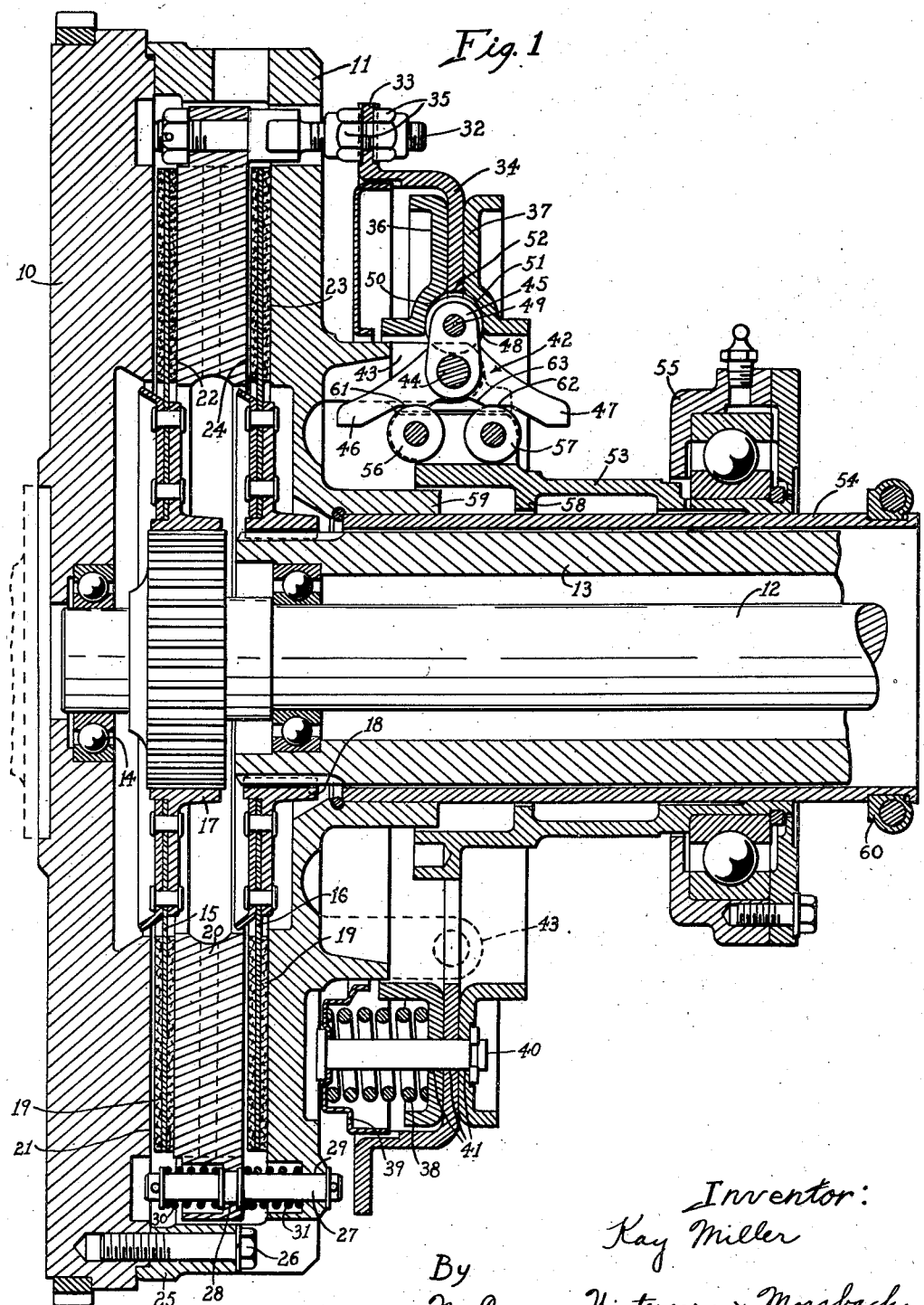
Figure 1 is a longitudinal section through a two-way clutch made in accordance with my invention.
Figure 2:
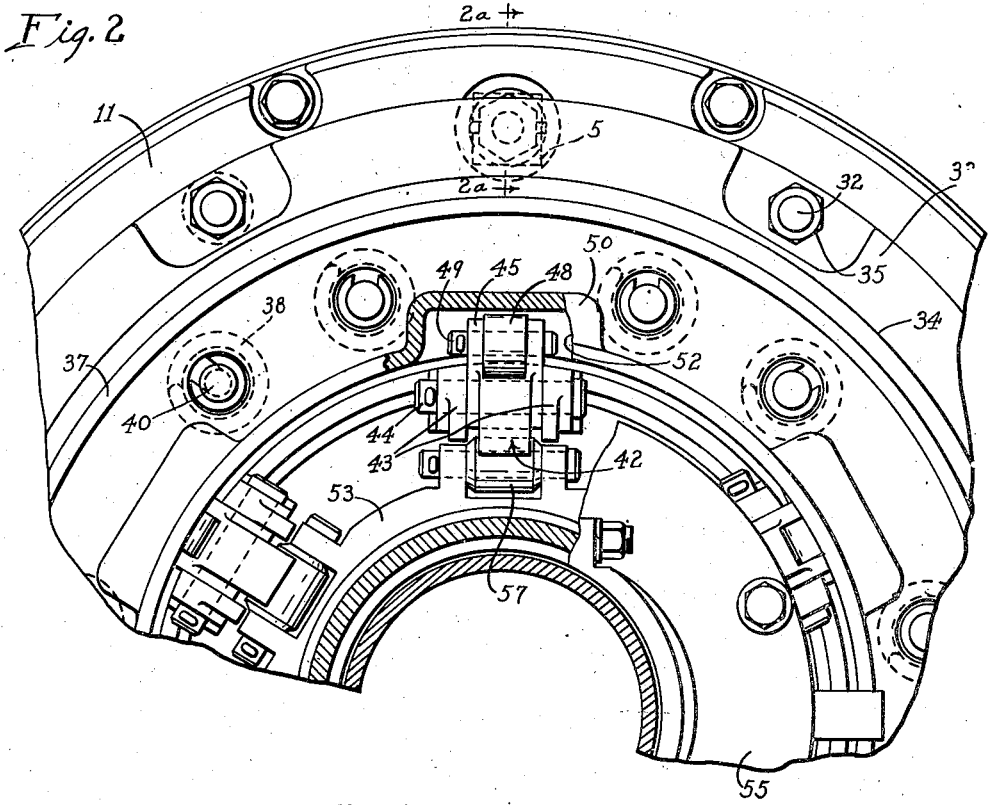
Fig. 2 is a fragmentary view of the clutch of Fig. 1 partly in rear elevation and partly in transverse section.
Figure 2A:
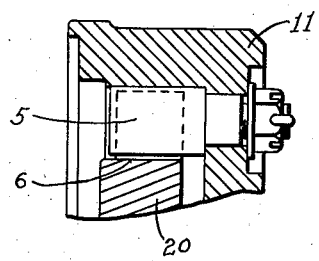
Fig. 2a is a sectional detail on the line 2a—2a of Fig. 2.

Referring to Figs. 1 and 2, the reference numeral 10 designates the flywheel of an engine and 11 the back plate thereon. 12 is the driven shaft extending rearwardly from the flywheel, adapted for direct connection with the propeller shaft or to be extended into the front end of the gear box of a transmission, and 13 is a quill surrounding the shaft and serving as an auxiliary driven member, one of the members 12 and 13 being, for example, for high ratio drive and the other for low ratio drive. The shaft 12 has the usual pilot bearing 14 supporting the front end thereof at the center of the flywheel. There are two clutch disks 15 and 16, the disk 15 having its center hub 17 splined on the front end of the shaft 12 to transmit drive from the flywheel to the shaft when the disk 15 is engaged, and the disk 16 having its hub 18 splined on the front end of the quill 13 to transmit drive from the flywheel to the quill when the disk 16 is engaged. 19 designates the usual pads or facings on the clutch disks, and a pressure plate 20 is disposed between these disks, adapted when moved forwardly to engage disk 15 with the driving face 21 on the back of the flywheel and the companion driving face 22 on the front of the pressure plate. The pressure plate is also movable rearwardly for engagement with disk 16 to cause engagement thereof with the driving face 23 on the inner side of the back plate 11 and the companion driving face 24 on the back of the pressure plate. The surfaces 21—24 are, of course, all accurately machined on these cast parts to insure smooth clutch engagement. The back plate is bolted to the flywheel by means of its marginal flange portion 25, as indicated at 26. The pressure plate 20 has sliding driving connections with the back plate 11 at circumferentially spaced points around the periphery thereof by means of studs 5 fixed on the back plate and having the flat side surfaces thereof slidably engaging the flat side surfaces of notches 6 cut in the periphery of the pressure plate. These studs 5 will, of course, transmit drive to the pressure plate in both of its engaged positions, and also turn the pressure plate with the flywhel in the neutral position of said plate. Pins 27 are slidably mounted in holes 28 provided in the pressure plate and registering holes 29 provided in the back plate at circumferentially spaced points. Coiled compression springs 30 and 31 are held caged on each of the pins 27 on opposite sides of the pressure plate and tend to hold the pressure plate in the neutral position illustrated. That is to say, the springs 30 act between the pins 27 and the pressure plate tending to resist movement of the pressure plate toward the clutch disk 15, whereas the springs 31 acting between the back plate and the pressure plate tend to resist movement of the pressure plate toward the clutch disk 16, and these opposing springs are in balanced equilibrium when the pressure plate is in the neutral position.

The pressure plate 20 has studs 32 mounted on the rim portion thereof in circumferentially spaced relation, and these studs are adjustably secured to the peripheral flange 33 of a cupped sheet metal thrust ring 34 by nuts 35 threaded on said studs. Two other sheet metal rings 36 and 37 are disposed on opposite sides of the radially inner portion of the ring 34 and are urged toward one another by a single series of coiled compression springs 38 disposed in circumferentially spaced relation with respect to the ring 36, between the ring 36 and a retaining ring 39. Pins 40 slidable in registering holes 41 in the rings 34, 36, and 37 extend through the springs 38 and through holes in the retainer ring 39 and hold the parts together with the springs 38 caged under a predetermined compression, known as a "preload" pressure, so that when the pressure plate is held engaged under additional compression of the springs 38, the clutch is engaged under a desired increased spring pressure above the "preload" pressure. A single series of clutch actuating levers 42 is provided in accordance with my invention operating between the rings 36 and 37 to move the pressure plate 20 selectively in either direction and hold it engaged under pressure of the springs 38. The levers 42 are disposed in circumferentially spaced relation relative to the back plate 11, each being mounted between a pair of lugs 43 cast integral with the back plate, the lugs carrying a cross-pin 44 for pivotal support of the lever 42. Each of the levers 42 has three arms, 45, 46, and 47. The arm 45 is forked and has a roller 48 rotatably mounted therein on a cross-pin 49, the roller being received in arcuate recesses 50 and 51 struck radially in the inner marginal edge portions of the rings 36 and 37, respectively. The ring 34 is cut away, as indicated at 52, for reception of the arm 45 and roller 48, so that the lever 42 is free to oscillate in either direction with respect to the ring 34 for actuation of the clutch. When the lever 42 is oscillated in a clockwise direction from the position shown in Fig. 1, the initial movement causes movement of the pressure plate 20 and the three rings 34, 36, and 37 as a unitary assembly until the clutch disk 16 is packed between the surfaces 23 and 24, after which the further movement of the lever 42 causes movement of the ring 37 away from the ring 34, thereby compressing the springs 38 and transmitting this increased spring pressure through the ring 34 to the pressure plate so as to hold the clutch disk 16 engaged under heavy spring pressure. When the lever 42 is oscillated in a counterclockwise direction from the position shown in Fig. 1, the pressure plate 20 is moved toward the clutch disk 15, and after the clutch disk is packed between the surfaces 21 and 22, the ring 36 in the further movement of the lever 42 is moved away from the ring 34, thereby compressing the springs 38 so that increased spring pressure is transmitted through the ring 34 to the pressure plate to keep the clutch disk 15 engaged under heavy spring pressure. The rings 36 and 37 are both stamped to channel-shaped cross-section, as indicated, and the same is true of the retainer ring 39, whereby to reinforce these rings and make for maximum strength and rigidity with an otherwise relatively light sheet metal construction.

A throw-out collar 53 is reciprocable on a tubular guide 54 provided therefor rigid with and projecting rearwardly from the back plate 11. The throw-out collar is reciprocable by means of the anti-friction shifter ring 55, which is usually provided with trunnions for cooperation with a yoke or other clutch operating means, not shown. Spaced rollers 56 and 57 are rotatively mounted on the forward end of the throw-out collar to cooperate with the arms 46 and 47 of the clutch actuating levers 42, respectively, to oscillate the levers in a clockwise direction in the forward movement of the throw-out collar and in a counterclockwise direction in the rearward movement thereof. Forward movement of the collar 53 is limited by engagement of the internal annular flange 58 on the collar with the central hub portion 59 of the back plate. Rearward movement of the collar 53 is limited by engagement of the sleeve with a stop ring 60 secured on the rear end of the tubular guide 54. The springs 38 can, therefore, be subjected only to a predetermined degree of compression. Each of the levers 42 is formed so that the arms 46 and 47 extend inwardly in diverging relation. Flats 61 and 62 are provided in the crotch portion of the lever between the arms 46 and 47 for engagement with the rollers 56 and 57 in the neutral position of the lever, whereby positively to hold the lever in neutral position while permitting a certain amount of free movement of the throw-out collar 53 in the neutral zone. The crotch portion is cut away, as indicated at 63, between the flats 61 and 62 for clearance purposes, the roller 57 being received in this cut-out portion when the throw-out collar is moved forward for engagement of the clutch disk 16, and the roller 56 being received in this cut-out portion when the throw-out collar 53 is moved to the rear for engagement of the clutch disk 15.

In operation, the clutch is used in conjunction usually with a two-rate transmission. The shaft 12 may be connected either directly through a universal joint with the propeller shaft of the tractor, truck, tank, or other vehicle, or extended into the front end of the gear box of a change-speed transmission providing any desired number of speeds for forward and reverse drive. The quill 13 for the low ratio drive has a reduction gearing connection with the shaft 12, and when the disk 15 on the shaft 12 is engaged, the quill 13 and disk 16 are driven idly through said reduction gearing connection. On the other hand, when the clutch disk 16 is engaged for the low ratio drive, the disk 15 and shaft 12 are driven idly by reason of the reduction gearing connection mentioned. Forward movement of the throw-out collar 53 by means of a manually operable clutch pedal or lever (not shown) causes engagement of the disk 16 in the manner previously described. When the throw-out collar is moved rearwardly, the disk 15 is engaged in the manner previously described. The springs 38 in addition to providing resilient engagement so that close adjustment of the clutch is not required provide substantially constant pressure and, accordingly, non-slipping engagement regardless of the usual wear on the clutch facings 19. When the throw-out collar 53 is in the neutral position shown in Fig. 1, the springs 30 and 31 keep the pressure plate 20 in a mid-position out of engagement with both disks, while the rollers 56 and 57 by engagement with the flats 61 and 62 on the levers 42 positively hold said levers in neutral position so that there is no likelihood of accidental engagement of the clutch.

On the other hand, when the clutch is engaged, using either of the disks 15 or 16, it is locked up in such condition by the levers 42 under pressure of the springs 37, thus insuring positive engagement of the clutch.

It is believed the foregoing description conveys a good understanding of the objects and advantages of my invention. The appended claims have been drawn to cover all legitimate modifications and adaptations.

I claim:

1. In a clutch mechanism, the combination of clutch disks connected to separate rotary parts, a pressure plate shiftable to driving engagement selectively with either clutch disk, a support connected in fixed spaced relation to and turning with the pressure plate, a pair of rings mounted on opposite sides of the support in concentric relation with the pressure plate and guided on the support for limited axial movement with respect thereto, a plurality of springs in circumferentially spaced relation to said rings holding the same normally in engagement with the opposite sides of said support, and positive acting means for moving the pressure plate in either direction to engage either clutch disk, said means extending between said rings to transmit pressure selectively to either ring and through the springs and support to the pressure plate, whereby to engage the clutch resiliently in either direction.

2. In a clutch mechanism, the combination of clutch disks connected to separate rotary parts, a pressure plate shiftable to driving engagement selectively with either clutch disk, a support connected in fixed spaced relation to and turning with the pressure plate, a plurality of guide pins slidably mounted in openings provided in the support in circumferentially spaced relation, a pair of rings mounted on said pins on opposite sides of said support in concentric relation to the pressure plate and guided by said pins for limited axial movement with respect to the support, a plurality of springs in circumferentially spaced relation to said rings retained by said pins in compressed condition holding the rings normally in engagement with opposite sides of said support, and positive acting means for moving the pressure plate in either direction to engage either clutch disk, said means extending between said rings to transmit pressure selectively to either ring and through the springs and support to the pressure plate, whereby to engage the clutch resiliently in either direction.

3. In a clutch mechanism, the combination of clutch disks connected to separate rotary parts, a pressure plate shiftable to driving engagement selectively with either clutch disk, a support connected in fixed spaced relation to and turning with the pressure plate, two rings disposed on opposite sides of said support in concentric relation to said pressure plate, a spring retainer ring in spaced concentric relation to one of said rings, pins in circumferentially spaced relation to said rings and support slidably mounted on the support and interconnecting the retainer ring with the ring on the opposite side of said support, a plurality of springs in circumferentially spaced relation to said rings and held compressed between the retainer ring and the adjacent ring on the same side of the support, and positive acting means for moving the pressure plate in either direction to engage either clutch disk, said means extending between said rings to transmit pressure selectively to either ring and through the springs and support to the pressure plate, whereby to engage the clutch resiliently in either direction.

4. A clutch mechanism comprising, in combination, clutch disks connected to separate rotary parts, a pressure plate shiftable to driving engagement selectively with either clutch disk, a support connected in fixed spaced relation to and turning with the pressure plate, a pair of rings mounted on opposite sides of the support in concentric relation with the pressure plate and guided on the support for limited axial movement with respect thereto, a plurality of springs in circumferentially spaced relation to said rings holding the same normally in engagement with the opposite sides of said support, and positive acting oscillatable clutch actuating levers extending between said rings to transmit pressure selectively to either ring and through the springs and support to the pressure plate, whereby to engage the clutch resiliently in either direction, each of said clutch actuating levers having two arms extending inwardly in diverging relation, the clutch mechanism including a throw-out collar having two rollers mounted thereon in longitudinally spaced relation with respect thereto, the forward roller being arranged for rolling engagement with one arm and the rearward roller being arranged for rolling engagement with the other arm to oscillate the lever in the reciprocatory movement of the throw-out collar.

5. A clutch mechanism comprising, in combination, clutch disks connected to separate rotary parts, a pressure plate shiftable to driving engagement selectively with either clutch disk, a support connected in fixed spaced relation to and turning with the pressure plate, a pair of rings mounted on opposite sides of the support in concentric relation with the pressure plate and guided on the support for limited axial movement with respect thereto, a plurality of springs in circumferentially spaced relation to said rings holding the same normally in engagement with the opposite sides of said support, and positive acting oscillatable clutch actuating levers extending between said rings to transmit pressure selectively to either ring and through the springs and support to the pressure plate, whereby to engage the clutch resiliently in either direction, each of said clutch actuating levers having two arms extending inwardly in diverging relation, the clutch mechanism including a throw-out collar having two rollers mounted thereon in longitudinally spaced relation with respect thereto, the forward roller being arranged for rolling engagement with one arm and the rearward roller being arranged for rolling engagement with the other arm to oscillate the lever in the reciprocatory movement of the throw-out collar, and said lever having flat lands thereon between said arms which are substantially parallel to the axis of rotation of the flywheel in the neutral position of the lever, said lands having engagement with the rollers in the neutral position of the lever to maintain the lever in neutral position while permitting a predetermined amount of movement of the throw-out collar independently of the lever in the neutral zone.

6. A clutch mechanism comprising, in combination, clutch disks connected to separate rotary parts, a pressure plate shiftable to driving engagement selectively with either clutch disk, a support connected in fixed spaced relation to and turning with the pressure plate, a pair of rings mounted on opposite sides of the support in concentric relation with the pressure plate and guided on the support for limited axial movement with respect thereto, a plurality of springs in circumferentially spaced relation to said rings holding the same normally in engagement with the opposite sides of said support, and positive acting oscillatable clutch actuating levers extending between said rings to transmit pressure selectively to either ring and through the springs and support to the pressure plate, whereby to engage the clutch resiliently in either direction, each of said clutch actuating levers having two arms extending inwardly in diverging relation, the clutch mechanism including a throw-out collar having means thereon for engagement with either of said arms to oscillate the lever selectively in either direction in the reciprocatory movement of the collar, and said lever having flat lands thereon between said arms which are substantially parallel to the axis of rotation of the flywheel in the neutral position of the lever, said lands having engagement with the means on the collar in the neutral position of the lever to maintain the lever in neutral position while permitting a predetermined amount of movement of the throw-out collar independently of the lever in the neutral zone.

7. In a clutch mechanism, the combination with a flywheel constituting the driving element and a back plate in fixed axially spaced relation to the flywheel and turning therewith of two separate and independent clutch disks between the flywheel and back plate constituting the driven elements, a pressure plate shiftable to driving engagement selectively with either clutch disk, spring means for normally holding the pressure plate in a neutral position out of driving engagement with either of said disks, a support connected in fixed spaced relation to and turning with the pressure plate, a pair of rings mounted on opposite sides of the support in concentric relation with the pressure plate and guided on the support for limited axial movement with respect thereto, a plurality of springs in circumferentially spaced relation to said rings holding the same normally in engagement with the opposite sides of said support, and positive acting means for moving the pressure plate in either direction to engage either clutch disk, said means extending between said rings to transmit pressure selectively to either ring and through the springs and support to the pressure plate, whereby to engage the clutch resiliently in either direction.

8. In a clutch mechanism, the combination with a flywheel constituting the driving element and a back plate in fixed axially spaced relation to the flywheel and turning therewith, of two separate and independent clutch disks between the flywheel and back plate constituting the driven elements, a pressure plate shiftable to driving engagement selectively with either clutch disk, spring means for normally holding the pressure plate in a neutral position out of driving engagement with either of said disks, a support disposed behind the back plate and connected in fixed spaced relation to and turning with the pressure plate, a pair of rings mounted on opposite sides of the support in concentric relation with the pressure plate and guided on the support for limited axial movement with respect thereto, a plurality of springs in circumferentially spaced relation to said rings holding the same normally in engagement with the opposite sides of said support, and clutch actuating lever means oscillatably mounted on the back plate and extending between said rings to transmit pressure selectively to either ring and through the springs and support to the pressure plate, whereby to engage the clutch resiliently in either direction.

9. In a clutch mechanism, the combination with a flywheel constituting the driving element and a back plate in fixed axially spaced relation to the flywheel and turning therewith, of two separate and independent clutch disks between the flywheel and back plate constituting the driven elements, a pressure plate shiftable to driving engagement selectively with either clutch disk, spring means for normally holding the pressure plate in a neutral position out of driving engagement with either of said disks, a support disposed behind the back plate and connected in fixed spaced relation to and turning with the pressure plate, a plurality of guide pins slidably mounted in openings provided in the support in circumferentially spaced relation, a pair of rings mounted on said pins on opposite sides of said support in concentric relation to the pressure plate and guided by said pins for limited axial movement with respect to the support, a plurality of springs in circumferentially spaced relation to said rings retained by said pins in compressed condition holding the rings normally in engagement with opposite sides of said support, and clutch actuating lever means oscillatably mounted on the back plate and extending between said rings to transmit pressure selectively to either ring and through the springs and support to the pressure plate, whereby to engage the clutch resiliently in either direction.

10. In a clutch mechanism, the combination with a flywheel constituting the driving element and a back plate in fixed axially spaced relation to the flywheel and turning therewith, of two separate and independent clutch disks between the flywheel and back plate constituting the driven elements, a pressure plate shiftable to driving engagement selectively with either clutch disk, spring means for normally holding the pressure plate in a neutral position out of driving engagement with either of said disks, a support disposed behind the back plate and connected in fixed spaced relation to and turning with the pressure plate, two rings disposed on opposite sides of said support in concentric relation to said pressure plate, a spring retainer ring in spaced concentric relation to one of said rings, pins in circumferentially spaced relation to said rings and support slidably mounted on the support and interconnecting the retainer ring with the ring on the opposite side of said support, a plurality of springs in circumferentially spaced relation to said rings and held compressed between the retainer ring and the adjacent ring on the same side of the support, and clutch actuating lever means oscillatably mounted on the back plate and extending between said rings to transmit pressure selectively to either ring and through the springs and support to the pressure plate, whereby to engage the clutch resiliently in either direction.

11. In a friction clutch comprising a pressure plate for holding the clutch engaged, clutch actuating mechanism comprising a support connected in fixed spaced relation to and turning with the pressure plate, a pair of rings mounted on opposite sides of the support in concentric relation to the pressure plate and guided on the support for limited axial movement with respect thereto, a plurality of springs in circumferentially spaced relation to said rings holding the same normally in engagement with the opposite sides of said support, and positive acting means for moving the pressure plate to engage the clutch, said means extending between said rings to transmit pressure to one of said rings and through the springs and support to the pressure plate, whereby to engage the clutch resiliently.

12. In a friction clutch comprising a pressure plate for holding the clutch engaged, clutch actuating mechanism comprising a support connected in fixed spaced relation to and turning with the pressure plate, a plurality of guide pins slidably mounted in openings provided in the support in circumferentially spaced relation, a pair of rings mounted on said pins on opposite sides of the support in concentric relation to the pressure plate and guided by said pins for limited axial movement with respect to the support, a plurality of springs in circumferentially spaced relation to said rings retained by said pins in compressed condition holding the rings normally in engagement with the opposite sides of said support, and positive acting means for moving the pressure plate to engage the clutch, said means extending between said rings to transmit pressure to one of said rings and through the springs and support to the pressure plate, whereby to engage the clutch resiliently.

13. In a friction clutch, a pressure plate for holding the clutch engaged, clutch actuating mechanism comprising a support connected in fixed spaced relation to and turning with the pressure plate, a pair of rings mounted on opposite sides of the support in concentric relation to the pressure plate, a spring retainer ring in spaced concentric relation to one of said rings, pins in circumferentially spaced relation to said rings and support slidably mounted on the support and interconnecting the retainer ring with the ring on the opposite side of said support, a plurality of springs in circumferentially spaced relation to said rings and held compressed between the retainer ring and the adjacent ring on the same side of the support, and positive acting means for moving the pressure plate to engage the clutch, said means extending between said rings to transmit pressure to one of said rings and through the springs and support to the pressure plate, whereby to engage the clutch resiliently.

14. In a friction clutch comprising a pressure plate for holding the clutch engaged, clutch actuating mechanism comprising a support connected in fixed spaced relation to and turning with the pressure plate, a pair of rings mounted on opposite sides of the support in concentric relation to the pressure plate and guided on the support for limited axial movement with respect thereto, a plurality of springs in circumferentially spaced relation to said rings holding the same normally in engagement with the opposite sides of said support, and positive acting oscillatable clutch actuating levers extending between said rings to transmit pressure to one of said rings and through the springs and support to the pressure plate, whereby to engage the clutch resiliently, each of said clutch actuating levers having two arms extending inwardly in diverging relation, the clutch actuating mechanism including a throw-out collar having two rollers mounted thereon in longitudinally spaced relation with respect thereto, the forward roller being arranged for rolling engagement with one arm and the rearward roller being arranged for rolling engagement with the other arm to oscillate the lever in the reciprocatory movement of the throw-out collar.

15. In a friction clutch comprising a pressure plate for holding the clutch engaged, clutch actuating mechanism comprising a support connected in fixed spaced relation to and turning with the pressure plate, a pair of rings mounted on opposite sides of the support in concentric relation to the pressure plate and guided on the support for limited axial movement with respect thereto, a plurality of springs in circumferentially spaced relation to said rings holding the same normally in engagement with the opposite sides of said support, and positive acting oscillatable clutch actuating levers extending between said rings to transmit pressure to one of said rings and through the springs and support to the pressure plate, whereby to engage the clutch resiliently, each of said clutch actuating levers having two arms extending inwardly in diverging relation, the clutch actuating mechanism including a throw-out collar having two rollers mounted thereon in longitudinally spaced relation with respect thereto, the forward roller being arranged for rolling engagement with one arm and the rearward roller being arranged for rolling engagement with the other arm to oscillate the lever in the reciprocatory movement of the throw-out collar, and said lever having flat lands thereon between said arms which are substantially parallel to the axis of rotation of the flywheel in the neutral position of the lever, said lands having engagement with the rollers in the neutral position of the lever to maintain the lever in neutral position while permitting a predetermined amount of movement of the throw-out collar independently of the lever in the neutral zone.

16. In a friction clutch comprising a pressure plate for holding the clutch engaged, clutch actuating mechanism comprising a support connected in fixed spaced relation to and turning with the pressure plate, a pair of rings mounted on opposite sides of the support in concentric relation to the pressure plate and guided on the support for limited axial movement with respect thereto, a plurality of springs in circumferentially spaced relation to said rings holding the same normally in engagement with the opposite sides of said support, and positive acting oscillatable clutch actuating levers extending between said rings to transmit pressure to one of said rings and through the springs and support to the pressure plate, whereby to engage the clutch resiliently, each of said clutch actuating levers having two arms extending inwardly in diverging relation, the clutch actuating mechanism including a throw-out collar having means thereon for engagement with either of said arms to oscillate the lever selectively in either direction in the reciprocatory movement of the collar, and said lever having flat lands thereon between said arms which are substantially parallel to the axis of rotation of the flywheel in the neutral position of the lever, said lands having engagement with the means on the collar in the neutral position of the lever to maintain the lever in neutral position while permitting a predetermined amount of movement of the throw-out collar independently of the lever in the neutral zone.

17. In a clutch mechanism, the combination of clutch disks connected to separate rotary parts, a pressure plate shiftable to driving engagement selectively with either clutch disk, a thrust ring operatively connected with said pressure plate to move the same in either direction to engage either disk, a pair of spring pressed rings engaging said thrust ring to apply spring pressure thereto for resilient engagement of the clutch in either direction, spring means active on said pair of rings urging the same in opposite directions, and positive acting means for moving either of said spring pressed rings relative to the other spring pressed ring and thrust ring against the action of said spring means to move the pressure plate in either direction to engage either clutch disk resiliently under increased spring pressure.

18. In a clutch mechanism, the combination of clutch disks connected to separate rotary parts, a pressure plate shiftable to driving engagement selectively with either clutch disk, spring means for normally holding the pressure plate in a neutral position out of driving engagement with either of said disks, a thrust ring operatively connected with said pressure plate to move the same in either direction to engage either disk, a pair of spring pressed rings engaging said thrust ring to apply spring pressure thereto for resilient engagement of the clutch in either direction, spring means active on said pair of rings urging the same in opposite directions, and positive acting means for moving either of said spring pressed rings relative to the other spring pressed ring and thrust ring against the action of said spring means to move the pressure plate in either direction to engage either clutch disk resiliently under increased spring pressure.

19. In a friction clutch comprising a pressure plate for holding the clutch engaged, clutch actuating mechanism comprising a thrust ring operatively connected with said pressure plate to move the same to engage the clutch, a pair of spring pressed rings engaging said thrust ring to apply spring pressure thereto for resilient engagement of the clutch, springs means active on said pair of rings urging the same in opposite directions, and positive acting means for moving one of said spring pressed rings relative to the other spring pressed ring and thrust ring against the action of said spring means to move the pressure plate to engage the clutch under increased spring pressure.

20. In a clutch mechanism, the combination of clutch disks connected to separate rotary parts, a pressure plate shiftable to driving engagement selectively with either clutch disk, a thrust ring operatively connected with said pressure plate to move the same in either direction to engage either disk, a pair of spring pressed rings engaging said thrust ring to apply spring pressure thereto for resilient engagement of the clutch in either direction, spring means active on said pair of rings urging the same in opposite directions, a throw-out member reciprocable relative to the clutch, and lever means operatively connecting said throw-out member and said spring pressed rings to move either spring pressed ring relative to the other spring pressed ring and thrust ring to move the pressure plate in either direction to engage the clutch resiliently and lock it in either engaged position.

21. In a friction clutch comprising a pressure plate for holding the clutch engaged, clutch actuating mechanism comprising a thrust ring operatively connected with said pressure plate to move the same to engage the clutch, a pair of spring pressed rings engaging said thrust ring to apply spring pressure thereto for resilient engagement of the clutch, spring means active on said pair of rings urging the same in opposite directions, a throw-out member reciprocable relative to said clutch, and lever means operatively connecting said throw-out member and said spring pressed rings so as to permit engagement of the clutch resiliently and lock the clutch in engaged position.

KAY MILLER.